United States Patent
Iwabuchi et al.

(10) Patent No.: US 11,830,177 B2
(45) Date of Patent: Nov. 28, 2023

(54) IMAGE PROCESSING APPARATUS, CONTROL METHOD AND NON-TRANSITORY COMPUTER-READABLE RECORDING MEDIUM THEREFOR

(71) Applicant: CANON KABUSHIKI KAISHA, Tokyo (JP)

(72) Inventors: Kohei Iwabuchi, Kawasaki (JP); Mahoro Anabuki, Yokohama (JP); Nobuaki Kuwabara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/849,978

(22) Filed: Jun. 27, 2022

(65) Prior Publication Data
US 2022/0327687 A1 Oct. 13, 2022

Related U.S. Application Data

(63) Continuation of application No. 16/897,601, filed on Jun. 10, 2020, now Pat. No. 11,416,978, which is a
(Continued)

(30) Foreign Application Priority Data

Dec. 25, 2017 (JP) .................................. 2017-248005
Oct. 10, 2018 (JP) .................................. 2018-192136

(51) Int. Cl.
*G06K 9/00* (2022.01)
*G06T 7/00* (2017.01)
(Continued)

(52) U.S. Cl.
CPC .......... *G06T 7/0006* (2013.01); *G06T 1/0007* (2013.01); *G06T 7/60* (2013.01); *G06T 2207/30132* (2013.01)

(58) Field of Classification Search
CPC G06T 7/73; G06T 7/248; G06T 7/292; G06T 7/55; G06T 7/70; G06T 7/246;
(Continued)

(56) References Cited

U.S. PATENT DOCUMENTS 6,424,752 B1 * 7/2002 Katayama ............ H04N 1/3876
382/284
6,621,921 B1 * 9/2003 Matsugu ................... G06T 7/55
382/154
(Continued)

FOREIGN PATENT DOCUMENTS

CN 101859444 A 10/2010
CN 102082954 A 6/2011
(Continued)

OTHER PUBLICATIONS

Feb. 25, 2023 Chinese Official Action in Chinese Patent Appln. No. 201880084133.8.
(Continued)

*Primary Examiner* — Shervin K Nakhjavan
(74) *Attorney, Agent, or Firm* — Venable LLP

(57) ABSTRACT

An image processing apparatus acquires a first image which captures a scene including an object from a first viewpoint position and a second image which captures a scene including the object from a second viewpoint position, and associates a coordinate position corresponding to a position of a feature of the object on the first image with a coordinate position corresponding to a position of a feature of the object on the second image. The image processing apparatus determines a partial region in the second image corresponding to a give region in the first image based on the association, generates a synthesized image by replacing an image of the
(Continued)

given region using an image of the determined partial region, and superimposing variation data on the synthesized image.

23 Claims, 17 Drawing Sheets

Related U.S. Application Data continuation of application No. PCT/JP2018/041090, filed on Nov. 6, 2018.

(51) Int. Cl.
*G06T 1/00* (2006.01)
*G06T 7/60* (2017.01)

(58) Field of Classification Search
CPC ......... G06T 1/0007; G06T 2207/30132; G06T 2207/30184; G06T 7/0002; G06T 3/0068; G06T 7/0006; G06T 7/60; G06T 2207/10016; G06T 7/33; G06T 11/60; G06T 3/4038; G01B 11/03; G01B 2210/52; H04N 7/181; H04N 13/282; H04N 13/25; G01N 2021/8893; G01N 21/88; G01N 21/8803; G01N 21/8851; G01N 25/72; G09F 19/14
See application file for complete search history.

(56) References Cited

U.S. PATENT DOCUMENTS

| | | | |
|---|---|---|---|
| 6,970,166 B2 | 11/2005 | Kuroki et al. | |
| 7,092,109 B2 | 8/2006 | Satoh et al. | |
| 7,110,021 B2* | 9/2006 | Nobori | G06T 7/97 348/E7.086 |
| 7,411,588 B2 | 8/2008 | Kuroki et al. | |
| 7,446,768 B2 | 11/2008 | Satoh et al. | |
| 7,928,977 B2* | 4/2011 | Tanimura | G06T 19/006 345/632 |
| 7,990,385 B2* | 8/2011 | Kake | G06T 11/00 345/473 |
| 8,576,242 B2 | 11/2013 | Kitago | |
| 8,660,337 B2 | 2/2014 | Takahashi | |
| 8,830,231 B2* | 9/2014 | Ito | H04N 13/156 345/590 |
| 9,098,907 B2 | 8/2015 | Takahashi | |
| 9,182,487 B2* | 11/2015 | Troy | G01S 17/88 |
| 9,215,375 B2* | 12/2015 | Shintani | H04N 23/61 |
| 9,270,976 B2* | 2/2016 | Houvener | G03B 35/08 |
| 9,374,522 B2 | 6/2016 | Anabuki | |
| 9,804,144 B2* | 10/2017 | Schlaudraff | G01N 33/483 |
| 9,811,910 B1* | 11/2017 | Baldwin | G06V 10/803 |
| 9,934,575 B2 | 4/2018 | Takahashi | |
| 10,078,899 B2* | 9/2018 | Oh | G06T 7/33 |
| 10,375,279 B2* | 8/2019 | Ilic | H04N 23/69 |
| 10,776,910 B2 | 9/2020 | Karube | |
| 11,170,477 B2* | 11/2021 | Yonaha | G06T 3/4038 |
| 11,416,978 B2 | 8/2022 | Iwabuchi | |
| 2006/0140473 A1* | 6/2006 | Brooksby | G06T 7/33 382/285 |
| 2007/0081231 A1* | 4/2007 | Shirota | G02B 21/368 359/380 |
| 2007/0293755 A1* | 12/2007 | Shirahata | A61B 6/032 600/425 |
| 2007/0297665 A1* | 12/2007 | Segev | G06V 10/145 382/199 |
| 2008/0247667 A1* | 10/2008 | Jin | G06T 3/4038 382/284 |
| 2009/0015675 A1* | 1/2009 | Yang | B60R 1/00 348/148 |
| 2009/0092334 A1* | 4/2009 | Shulman | G06T 11/00 382/284 |
| 2010/0020201 A1* | 1/2010 | Chao | H04N 23/698 348/E5.022 |
| 2010/0053214 A1* | 3/2010 | Goto | A61B 6/468 345/629 |
| 2010/0171828 A1* | 7/2010 | Ishii | B62D 15/0275 348/135 |
| 2010/0259541 A1 | 10/2010 | Kitago | |
| 2011/0063297 A1* | 3/2011 | Toyama | G06T 15/503 345/426 |
| 2011/0129144 A1 | 6/2011 | Takahashi | |
| 2012/0262569 A1 | 10/2012 | Cudak et al. | |
| 2013/0278727 A1* | 10/2013 | Tamir | H04N 13/239 348/47 |
| 2014/0071132 A1* | 3/2014 | Noshi | A61B 6/022 345/427 |
| 2014/0104376 A1* | 4/2014 | Chen | G08B 13/19689 348/36 |
| 2014/0126807 A1 | 5/2014 | Takahashi | |
| 2014/0294263 A1* | 10/2014 | Hermosillo Valadez | G06T 7/33 382/128 |
| 2015/0125030 A1* | 5/2015 | Suzuki | A61B 5/441 382/103 |
| 2015/0154803 A1* | 6/2015 | Meier | G06T 19/00 345/633 |
| 2015/0294475 A1 | 10/2015 | Takahashi | |
| 2016/0117820 A1* | 4/2016 | Oh | G06V 10/751 348/47 |
| 2016/0188992 A1* | 6/2016 | Hiraga | G06V 10/44 382/199 |
| 2017/0018113 A1 | 1/2017 | Lattanzi | |
| 2017/0094163 A1* | 3/2017 | Ohba | H04N 7/0127 |
| 2017/0193693 A1* | 7/2017 | Robert | G01B 11/24 |
| 2018/0095450 A1* | 4/2018 | Lappas | G06T 19/00 |
| 2018/0235577 A1* | 8/2018 | Buerger | G06T 7/149 |
| 2018/0247135 A1* | 8/2018 | Oami | H04N 7/181 |
| 2018/0300868 A1* | 10/2018 | Kikuchi | G01M 5/0091 |
| 2018/0300874 A1 | 10/2018 | Karube | |
| 2019/0026955 A1* | 1/2019 | Ogata | G06T 7/579 |
| 2019/0075250 A1* | 3/2019 | Asai | H04N 7/18 |
| 2019/0139244 A1* | 5/2019 | Pras | A61B 34/35 |
| 2019/0180485 A1* | 6/2019 | Kim | G06T 11/60 |
| 2019/0273902 A1* | 9/2019 | Varekamp | H04N 13/122 |
| 2019/0340737 A1* | 11/2019 | Kawaguchi | H04N 23/698 |
| 2019/0355148 A1* | 11/2019 | Horita | G03B 15/00 |
| 2020/0302595 A1 | 9/2020 | Iwabuchi | |
| 2020/0400453 A1* | 12/2020 | Lee | G01C 21/3602 |
| 2023/0056006 A1* | 2/2023 | Gum | G06T 19/006 |

FOREIGN PATENT DOCUMENTS

| | | |
|---|---|---|
| EP | 2911041 A1 | 8/2015 |
| JP | H06-124339 A | 5/1994 |
| JP | H11-189970 A | 7/1999 |
| JP | 2001-349887 A | 12/2001 |
| JP | 2002-310920 A | 10/2002 |
| JP | 2003-051021 A | 2/2003 |
| JP | 2011-023814 A | 2/2011 |
| JP | 2011-032641 A | 2/2011 |
| JP | 5230013 B2 | 7/2013 |
| JP | 2016-079615 A | 5/2016 |
| JP | 2019-114238 A | 7/2019 |
| JP | 7058585 B2 | 4/2022 |
| WO | 2017/075247 A2 | 5/2017 |
| WO | 2017/126367 A1 | 7/2017 |

OTHER PUBLICATIONS

Mar. 24, 2023 Japanese Official Action in Japanese Patent Appln. No. 2022-062547.

Jan. 22, 2019 International Search Report in International Patent Application No. PCT/JP2018/041090.

Sep. 27, 2021 European Search Report in European Patent Application No. 18893774.2.

Thomas Ortner, et al., "Visual analytics and rendering for tunnel crack analysis", The Visual Computer, vol. 32, No. 6, XP035982460,

(56) References Cited

OTHER PUBLICATIONS

ISSN: 0178-2789, DOI: 10.1007/s00371-016-1257-5, May 11, 2016, pp. 859-869.

* cited by examiner

IMAGE PROCESSING APPARATUS, CONTROL METHOD AND NON-TRANSITORY COMPUTER-READABLE RECORDING MEDIUM THEREFOR

CROSS-REFERENCE TO RELATED APPLICATIONS

This application is a continuation of U.S. patent application Ser. No. 16/897,601, filed Jun. 10, 2020, which is a continuation of International Patent Application No. PCT/JP2018/041090, filed Nov. 6, 2018, which claims the benefit of Japanese Patent Application No. 2017-248005, filed Dec. 25, 20217, and Japanese Patent Application No. 2018-192136, filed Oct. 10, 2018, each of which are hereby incorporated by reference herein in their entirety.

BACKGROUND OF THE INVENTION

Field of the Invention

The present invention relates to a technique of synthesizing captured images.

Background Art

Conventionally, when inspecting concrete wall surfaces of a bridge, a dam, a tunnel, and the like, an inspection engineer approaches the concrete wall surface and visually checks variations such as cracks. However, such inspection work called close visual inspection has a problem that the operation cost is high. PTL 1 discloses a technique in which a concrete wall in a tunnel is captured using a camera, and cracks are detected based on the obtained captured image.

CITATION LIST

Patent Literature

PTL 1: Japanese Patent Laid Open No. 2002-310920

However, in the related art described above, when an obstacle exists between an inspection object such as a concrete wall surface and a camera that performs capturing, there is a problem that an image of a portion shielded by the obstacle cannot be obtained. Therefore, there is a possibility that a variation such as a crack on the concrete wall surface of the portion may be overlooked.

The present invention has been made in consideration of such problems, and provides a technique of generating an image which enables more suitable detection of variations in a situation in which an obstacle exists between an inspection object and a camera.

SUMMARY OF THE INVENTION

In order to solve the above-described problems, an image processing apparatus according to the present invention includes an arrangement described below. That is, the image processing apparatus comprises:
one or more processors; and
one or more memories including instructions that, when executed by the one or more processors, cause the communication apparatus to perform a method comprising:
acquiring a first image which captures a scene including an object from a first viewpoint position and a second image which captures a scene including the object from a second viewpoint position different from the first viewpoint position,
associating a coordinate position corresponding to a position of a feature of the object on the first image with a coordinate position corresponding to a position of a feature of the object on the second image,
determining a partial region in the second image corresponding to a give region in the first image based on the association,
generating a synthesized image by replacing an image of the given region in the first image using an image of the determined partial region, and
displaying variation data representing a variation that has occurred in the object by superimposing the variation data on the generated synthesized image.

Further features of the present invention will become apparent from the following description of exemplary embodiments with reference to the attached drawings.

BRIEF DESCRIPTION OF THE DRAWINGS

The accompanying drawings are included in and constitute a part of the specification, illustrate embodiments of the present invention and, together with the description, serve to explain the principles of the present invention.

DESCRIPTION OF THE EMBODIMENTS

Hereinafter, an example of embodiments of the present invention will be explained in detail with reference to the accompanying drawings. Note that the following embodiments are merely examples, and not intended to limit the scope of the present invention.

First Embodiment

As the first embodiment of an image processing apparatus according to the present invention, an image processing apparatus that synthesizes two images obtained by capturing a floor slab of a bridge from two different viewpoint positions will be described below as an example.

Capturing of Floor Slab of Bridge

Figure 1:
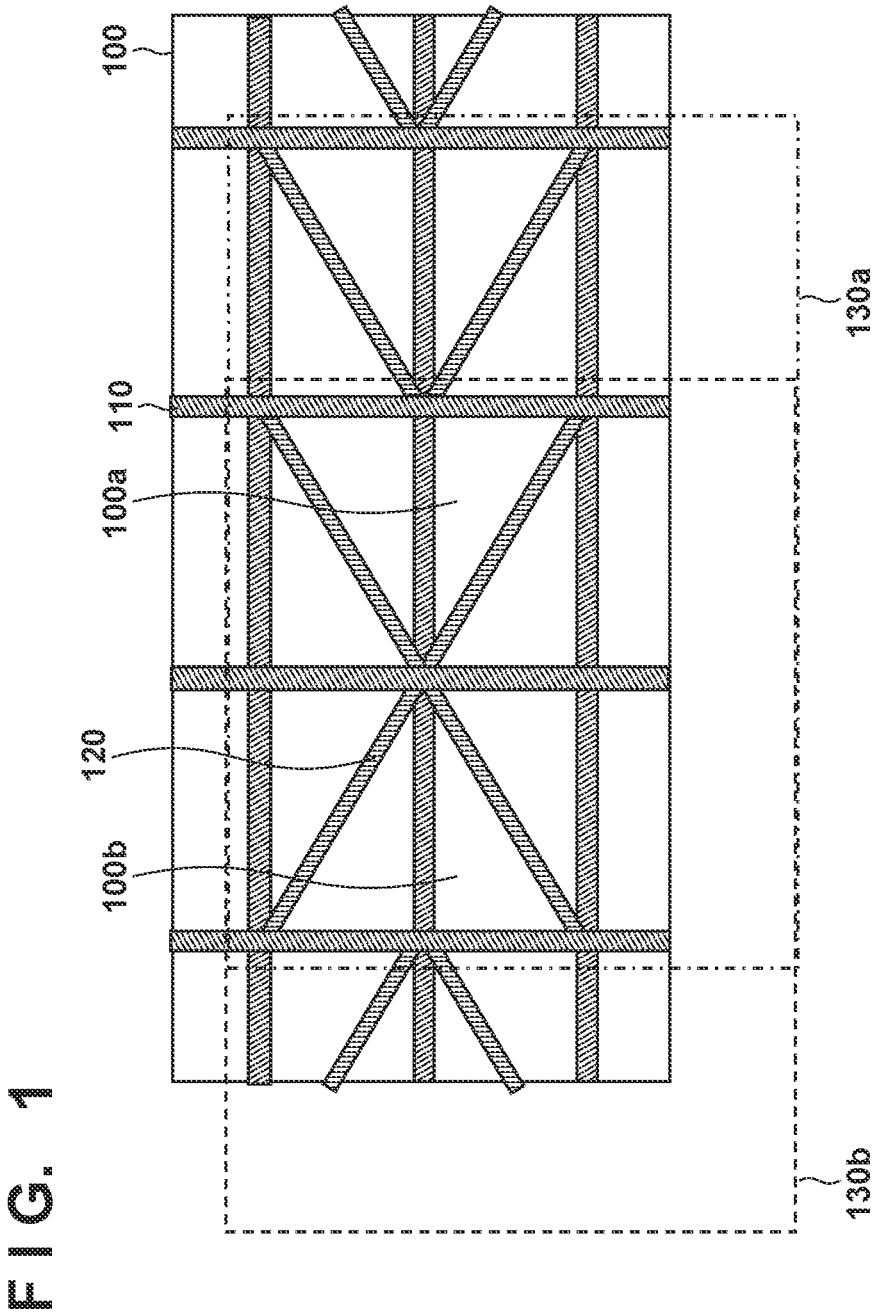
FIG. 1 is a view exemplarily showing how a floor slab looks when observed from below a bridge.

FIG. 1 is a view exemplarily showing how a floor slab 100 looks when observed from below the bridge. Note that the floor slab is a structure for transmitting the weight of a vehicle or the like passing over a bridge to a bridge girder acid bridge piers. Here, the concrete floor slab 100 is supported by a lattice-shaped steel bridge girder 110, and diagonal members 120 are arranged on the side of the steel bridge girder 110 not in contact with the floor slab 100. Therefore, when observed from below, the diagonal member 120 crosses the floor slab 100 in front of the floor slab 100.

A camera captures a floor slab region surrounded by a lattice formed by the steel bridge girder. In particular, for descriptive simplicity, it is assumed below that capturing is performed using the camera from a viewpoint position directly below the floor slab region surrounded by each lattice. In addition, it is assumed that an image of an adjacent floor slab region is captured together with the center floor slab region in each captured image. Note that it is assumed here that image capturing is performed from different viewpoint positions by moving the camera.

Figure 10:
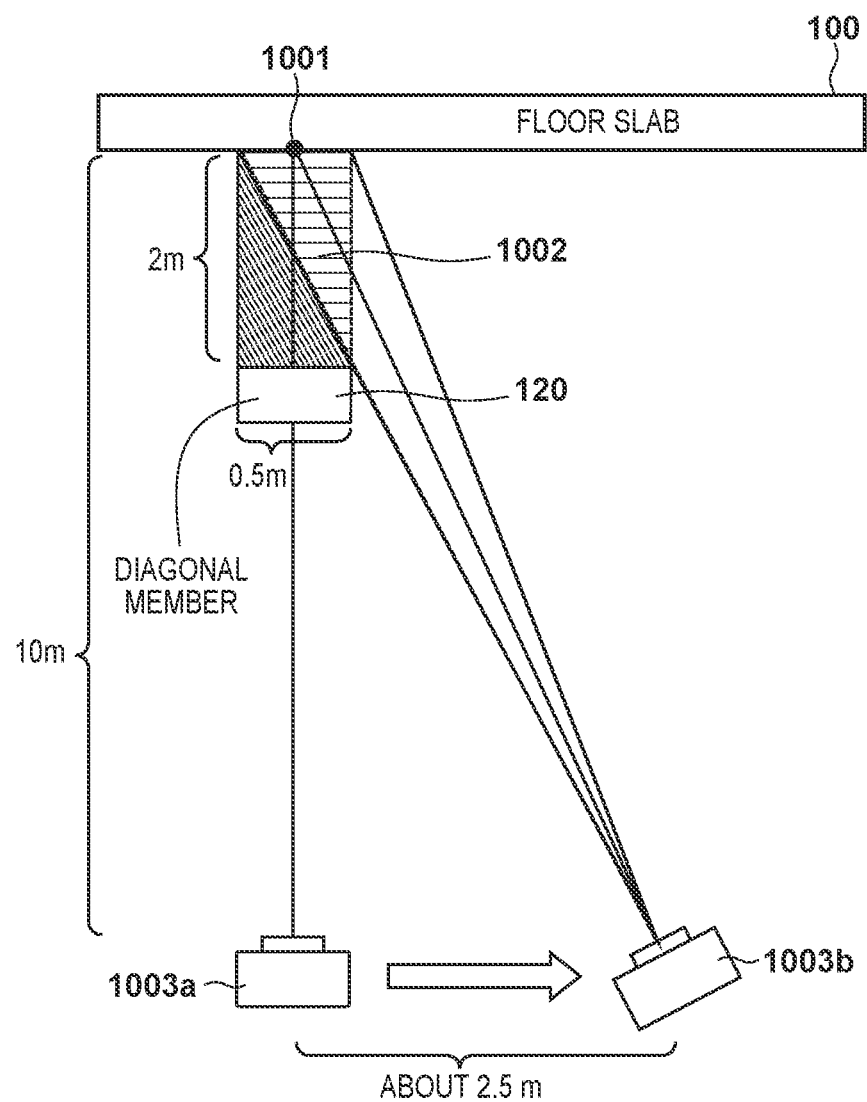
FIG. 10 is a schematic view showing an example of an environment in which the floor slab is captured.

FIG. 10 is a schematic view showing an example of an environment in which the floor slab is captured. A variation 1001 is a variation such as a crack appearing on the surface of the floor slab 100, and is an object to be included in a captured image. A space 1002 indicated by a gray rectangle is a space region in which the diagonal member 120 blocks the field of view when a camera 1003a installed at a viewpoint position immediately below the variation 1001 captures directly above. That is, the variation 1001 does not appear in the image captured by the camera 1003a. The camera 1003a is used by being fixed to, for example, a tripod or a camera platform and is fixed at a height of about 1 m from the ground. In the example shown in FIG. 10, the camera 1003a is located 10 below the floor slab 100. As shown in FIG. 10, when the floor slab 100 and the diagonal member 120 are in a positional relationship of about 2 m apart, it only suffices to move the viewpoint position of capturing about 2.5 m in the horizontal direction to capture the variation 1001. A camera 1003b represents a state in which the camera 1003a is installed at a position moved about 2.5 in in the horizontal direction. The camera 1003b captures the floor slab at an angle (from an oblique direction) with respect to the floor slab, so that the variation 1001 appears in the captured image. Note that it is assumed here that capturing is performed from different viewpoint positions by moving the camera, but capturing may be performed using a plurality of cameras.

Ranges 130a and 130b in FIG. 1 exemplarily show capturing ranges of a scene when captured from the viewpoint positions directly below floor slab regions 100a and 100b, respectively. As is understood from FIG. 1, the floor slab regions 100a and 100b are included in both the ranges 130a and 130b.

Figure 2:
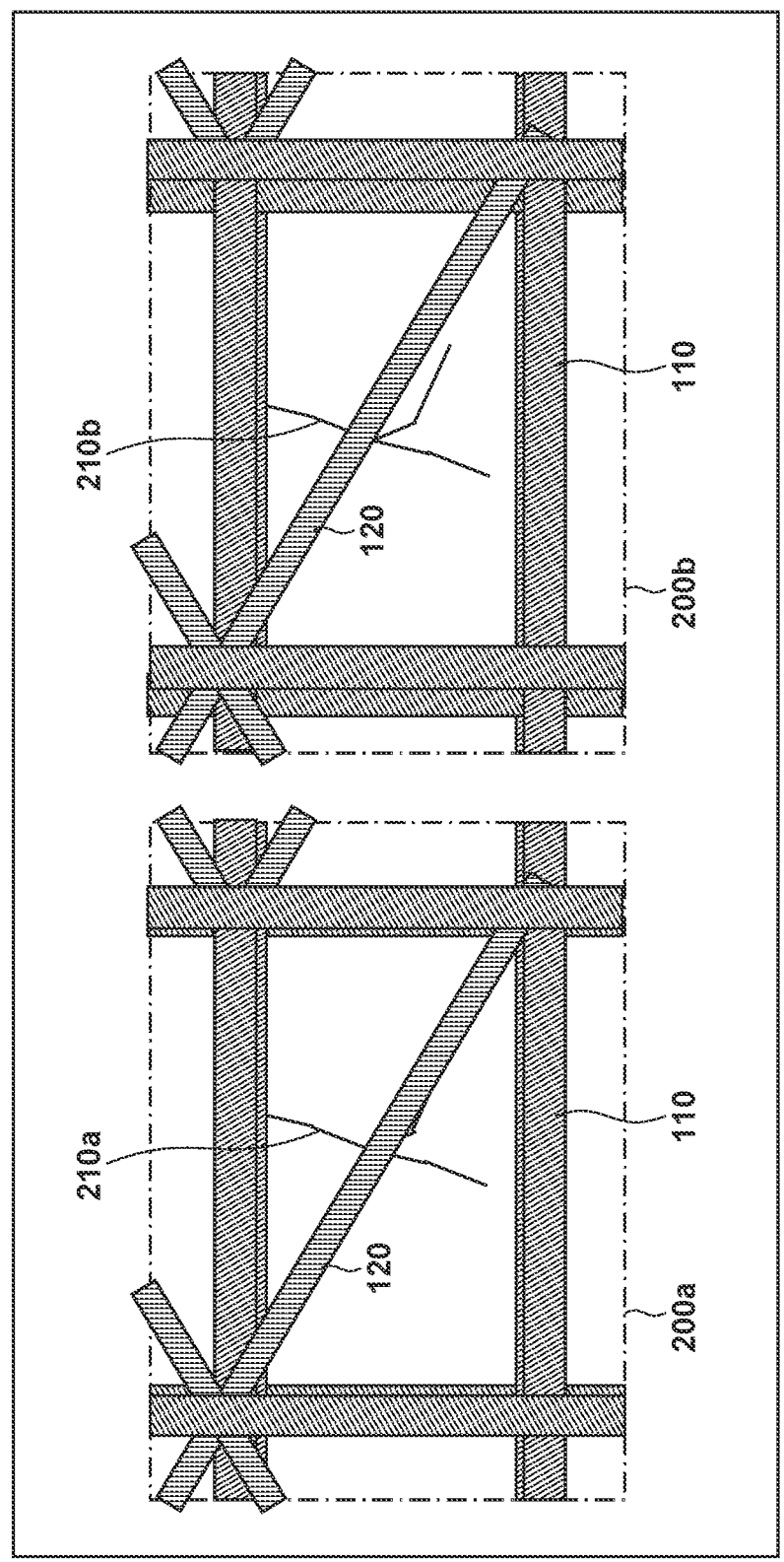
FIG. 2 is a view exemplarily showing images of the same floor slab region captured from different viewpoint positions.

FIG. 2 is a view exemplarily showing images of the same floor slab region 100a captured from different viewpoint positions. An image 200a exemplarily shows an image of the floor slab region 100a when captured from a viewpoint position directly below the floor slab region 100a. A crack 210a appears in the image 200a. On the other hand, an image 200b exemplarily shows an image of the floor slab region 100a when captured from a viewpoint position directly below the floor slab region 100b. A crack 210b appears in the image 200b, As will be described below, the crack 210a and the crack 210b are described as the crack 210 because they actually show the same crack.

As is understood from FIGS. 1 and 2, the image 200a corresponds to the image of the floor slab region 100a captured from the front, and the image 200b corresponds to the image of the floor slab region 100a captured diagonally from the left, Therefore, the positional relationship between the diagonal member 120 and the crack 210 is different between the image 200a and the image 200b. In addition, the vertical steel bridge girder 110 differently appears in the image 200a and the image 200b.

That is, the floor slab region shielded by the diagonal member is different between the image 200a and the image 200b due to the parallax, so that the crack 210 differently appears in these images, Therefore, in the first embodiment, an image of the floor slab region 100a with a small shielded region is generated by synthesizing the image 200a and the image 200b. This makes it possible to obtain an image which enables more suitable detection of variations such as the crack 210.

Arrangement of Image Processing Apparatus

Figure 3:
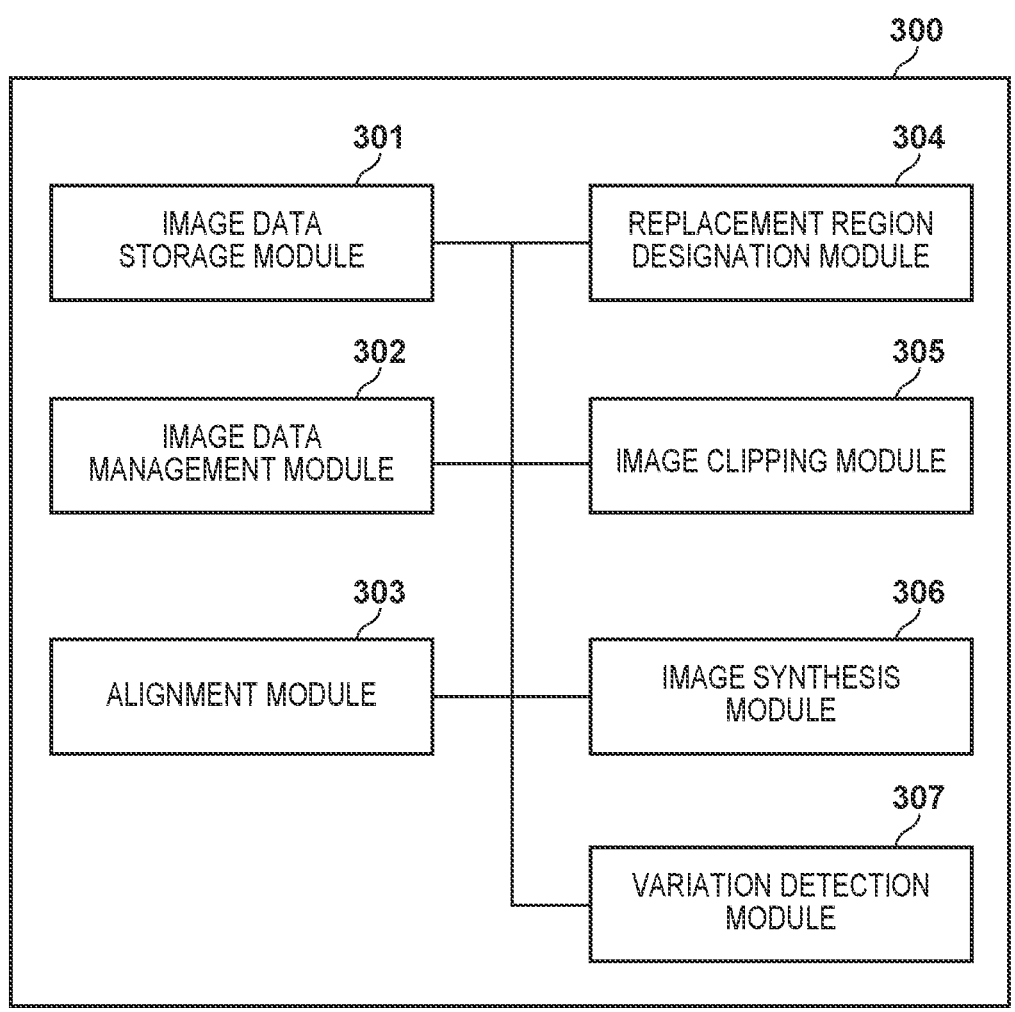
FIG. 3 is a block diagram showing an example of the functional arrangement of an image processing apparatus.
Figure 4:
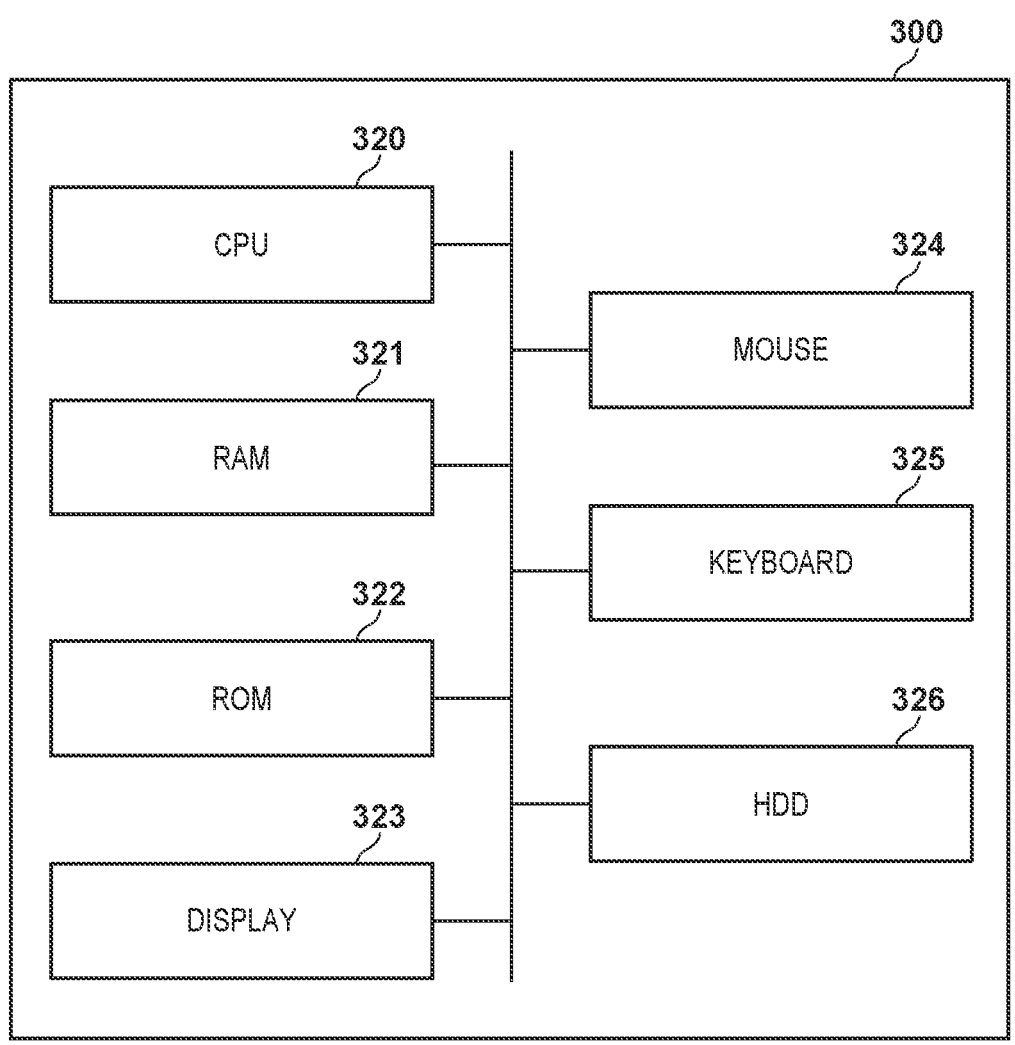
FIG. 4 is a block diagram showing an example of the hardware arrangement of the image processing apparatus.

FIG. 3 is a block diagram showing the functional arrangement of an image processing apparatus 300. FIG. 4 is a block diagram showing the hardware arrangement of the image processing apparatus 300. Here, an example is shown in which the image processing apparatus 300 is formed by a general personal computer (PC).

In the following description, a mode will be described in which each functional unit of the image processing apparatus 300 shown in FIG. 3 is implemented by a CPU executing a software program. However, some or all of the functional units of the image processing apparatus 300 shown in FIG. 3 may be configured to be processed by hardware such as an application specific integrated circuit (ASIC) or an FPGA. Here, FPGA is an abbreviation for field programmable gate array.

A CPU 320 comprehensively controls the image processing apparatus 300. The CPU 320 implements each functional unit shown in FIG. 3 by executing a control program stored in, for example, a ROM 322 or a hard disk drive (HDD) 326.

The HDD 326 stores, for example, an application program used in the image processing apparatus 300 or various types of control programs. The HDD 326 also stores images captured by the camera as described above (for example, the captured image indicated by the ranges 130a and 130b) and a design drawing to be described later. Further, the HDD 326 also stores various types of information related to the application program or various types of control programs. A RAM 321 is also used to temporarily store the various types of information. Each of a keyboard 325 and a mouse 324 is a functional unit that accepts an instruction input from a user. A display 323 is a functional unit that visually provides various types of information to the user.

An image data storage module 301 is formed by, for example, the HDD 326, an SSD (Solid State Drive), or a combination thereof. As described above, it stores images captured by the camera from a plurality of viewpoint positions. In addition, it stores a design drawing, which is an orthographic projection view as viewed from below the bridge, created based on the design drawing or the like of the target bridge.

Note that in the following description, captured images indicated by the ranges 130a and 130b are assumed as captured images, but each captured image may be a stitch-synthesis image of a plurality of captured images (one-shot captured images). That is, in order to perform precise crack detection, it is necessary to capture the floor slab with a high resolution (for example, one pixel of the captured image corresponds to 0.5 mm on the floor slab). At this time, when capturing is performed using a camera having, for example, 24 million pixels (lateral 6000 pixels×longitudinal 4000 pixels), one shot image includes the range of lateral 3 m×longitudinal 2 m, so the above-described captured-image condition (=including the image of an adjacent floor slab image) cannot be satisfied. Therefore, it is preferable to synthetize a plurality of one-shot images by stitch synthesis or the like to generate an image that satisfies the above-described captured-image condition.

An image data management module 302 manages image data stored in the HDD 326 described above. For example, it manages the viewpoint position at which each of the plurality of captured images is captured. Also, it manages association information between images derived by an alignment module 303 to be described later.

The alignment module 303 is a functional unit that determines association of position coordinates between two (or more) mages. For example, two images are displayed on the display 323 as a graphical user interface (GUI), and a designation of coordinates to be associated with each other in the two images is accepted from the user via the keyboard 325 and/or the mouse 324. Then, a coordinate conversion parameter for associating the coordinates with each other between the images is derived. Here, it is assumed that a known homography matrix is derived as the coordinate conversion parameter, but another coordinate conversion parameter may be calculated. Note that it is assumed here that the floor slab region can be approximated by a two-dimensional plane. It is also assumed that the portion of the steel girder surrounding the floor slab region, the portion in contact with the floor slab, exists on substantially the same plane as the floor slab region.

In general, it is necessary to designate four pairs of coordinates to derive a homography matrix. However, more pairs of coordinates may be designated to derive a homography matrix. In that case, for example, processing of calculating the sum of errors each of which is obtained as a result of coordinate conversion of coordinate values of each pair of coordinates and optimizing the parameter so as to minimize the sum is performed. In practice, the accuracy tends to improve as the number of coordinate pairs increases.

A replacement region designation module 304 is a functional unit that accepts a region in a base image (referred to as a main image hereinafter) of two images to be synthesized, the region in which the floor slab is shielded so does not appear. That is, a region to be replaced with the other image (referred to as a sub image hereinafter) of the two images to be synthesized is designated. For example, the main image is displayed as a GUI on the display 323, and a designation of the image region of the diagonal member included in the main image is accepted as a region of an arbitrary shape such as a polygon, a circle, or an ellipse from the user via the keyboard 325 and/or the mouse 324. Note that the replacement region may be designated not only as one region but also as a combination of two or more regions. In this case, a logical sum (OR) or a logical product (AND) for the combination is further designated.

Note that in processing of detecting a crack or the like, it is desirable that the image is captured from a position directly facing the floor slab. Therefore, in the following description, the image 200a (range 130a) obtained by capturing the floor slab region 100a from the front is used as the main image, and the image 200b (range 130b) obtained by capturing the floor slab region 100a diagonally from the left is used as the sub image. However, as image processing, any image may be used as the main image as long as the floor slab region to be processed appears in the image.

Figure 8:
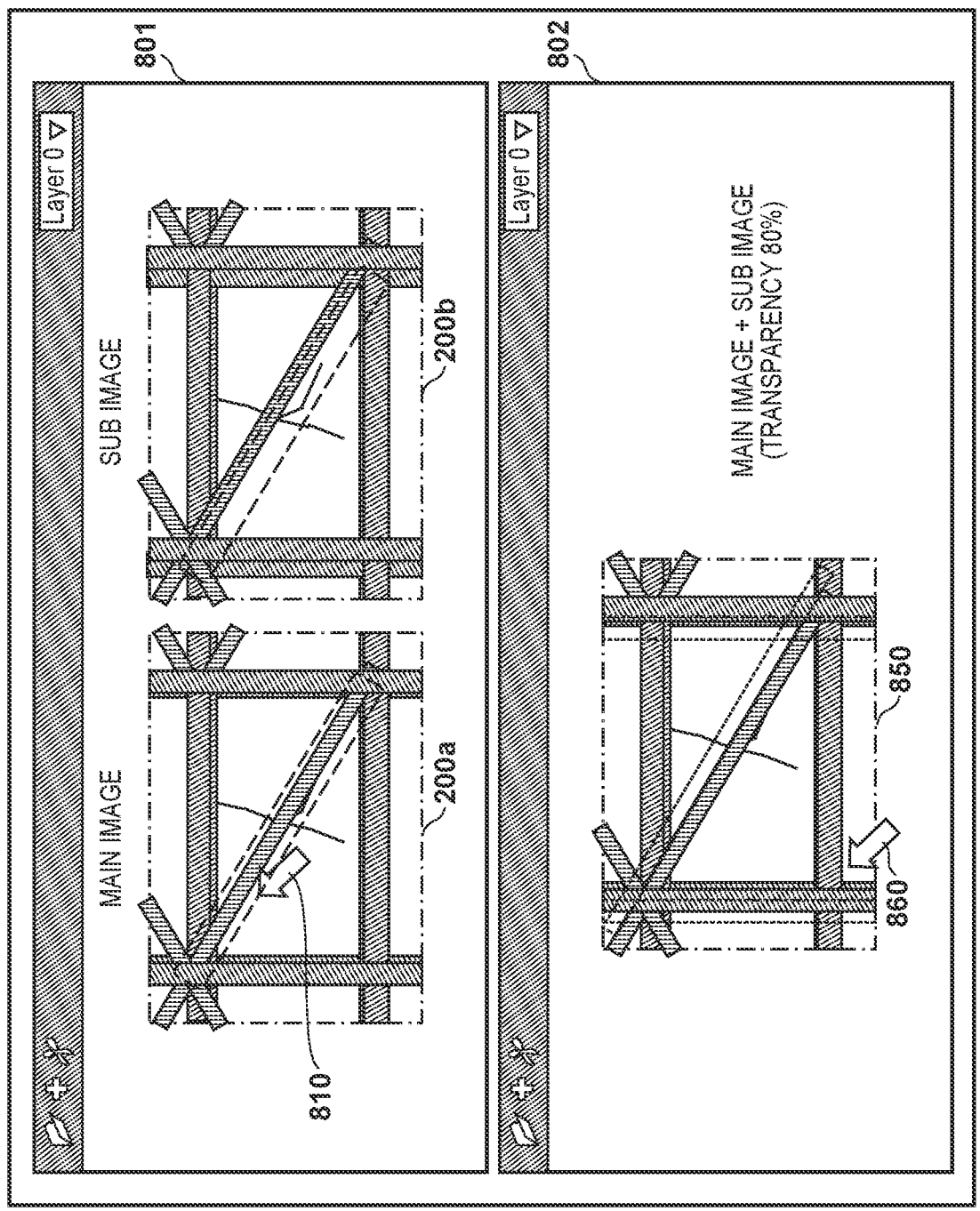
FIG. 8 is a view exemplarily showing GUIs for accepting a designation of a replacement region from a user.

FIG. 8 is a view exemplarily showing GUIs for accepting a designation of a replacement region from the user. These GUIs are displayed by the replacement region designation module 304 performing display control of a display unit such as the display 323. A GUI 801 is a GUI that arranges and displays the main image (image 200a) and the sub image (image 200b). When a replacement region is designated in the main image via a mouse cursor 810, a region corresponding to the replacement region is synchronously displayed in the sub image.

On the other hand, a GUI 802 is a GUI that superimposes and displays the main image and the sub image. Here, a state is shown in which the sub image is superimposed on the main image with a transparency of "80%". Noted that the transparency of the sub image can be designated. When there are a plurality of sub images, the sub image to be displayed may be switchable. Further, the plurality of sub images having undergone translucent processing may be superimposed and displayed on the main image.

By configuring such GUIs, it is possible to intuitively know the region in the sub image corresponding to the replacement region designated in the main image. Note that each of the GUI 801 and the GUI 802 is provided with buttons or the like for receiving an operation from the user. For example, a button for selecting the main image, a pull-down list for selecting the sub image, a button for starting designation of a replacement region on the main image, and a button for clipping a region on the sub image corresponding to the replacement region are provided.

An image clipping module 305 is a functional unit that clips the image of the region in the sub image corresponding to the replacement region designated by the replacement region designation module 304. For example, the coordinates of the replacement region designated by the replacement region designation module 304 are converted into coordinates in the sub image using the coordinate conversion parameter derived by the alignment module 303, and the image of the region corresponding to the coordinates obtained by the conversion is clipped from the sub image.

The image synthesis module 306 is a functional unit that overwrites the replacement region designated by the replacement region designation module 304 with the clipped image clipped by the image clipping module 305 to generate a synthesized image. For example, it generates an image obtained by superimposing and displaying the clipped image clipped from the sub image on the main image.

Note that misalignment can occur between the main image and the clipped image due to various factors. Therefore, the clipped image may be displayed as an editable object image in a GUI, and editing (deformation such as scaling) of the clipped image may be accepted from the user via the keyboard 325 and/or the mouse 324.

Figure 9:
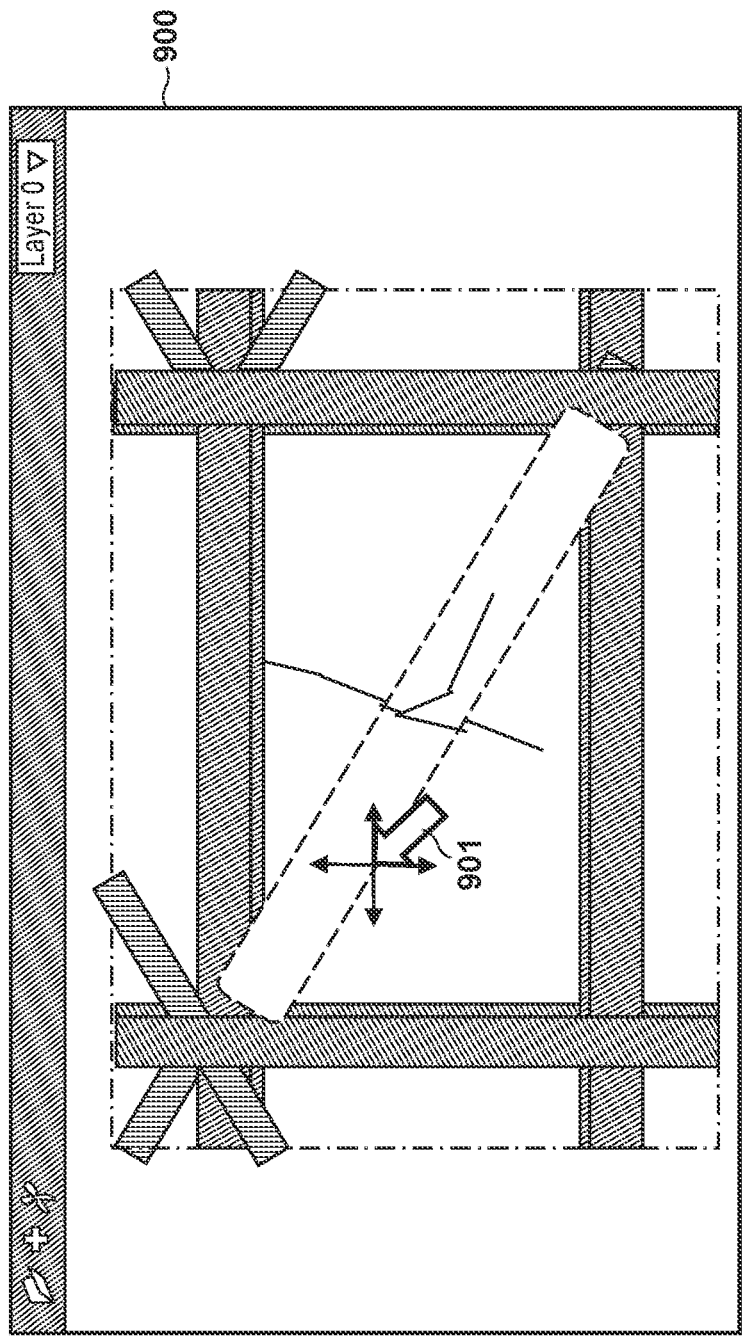
FIG. 9 is a view exemplarily showing a GUI for accepting modification of the synthesized image from the user.

FIG. 9 is a view exemplarily showing a GUI for accepting modification of the synthesized image from the user. In a window 900, the clipped image is superimposed and displayed as an editable object image on the main image. The user can perform a deformation operation such as scaling or moving the clipped image via a mouse cursor 901.

The variation detection module 307 is a functional unit that performs variation detection processing on the synthesized image generated by the image synthesis module 306. Here, variation detection processing is processing of detecting a variation (a crack or the like) in an image and recording the detected variation. For example, it displays the synthesized image on the GUI, accepts the position of the crack from the user by a trace operation using a mouse or the like, and records position data representing the trace location or the traced locus as crack data (variation data). Alternatively, a crack is automatically detected by image analysis processing using an algorithm such as machine learning, and the detected location of the crack is recorded as crack data. Note that, in order to facilitate processing, the crack data is preferably recorded as vector data indicating the locus of the crack.

In this embodiment, the crack data can be used as independent graphic data. For example, it is possible to provide a user interface capable of switching on/off the superimposed display of crack data on the synthesized image. In this manner, by checking the synthesized image while switching on/off the superimposed display, the user can more easily check correctness of the variation detection processing and perform supplementary work. In addition, the crack detection data is stored and, after a predetermined period has passed, superimposed and displayed on a synthesized image obtained by capturing the same floor slab of the same bridge. This makes it easy for the user to visually check whether the crack has extended. At this time, it may be configured that superimposition of crack detection data can be switched on/off. In particular, according to this embodiment, a synthesized image in which a region hidden by a shielding object has been complemented can be used as a target of variation detection processing, so that the variation detection processing can be performed more easily. That is, a complicated work is unnecessary, such as performing variation detection processing on each of a plurality of images captured from different capturing positions and distinguishing overlapping portions and non-overlapping portions from the results obtained from the plurality of images.

Figure 11:
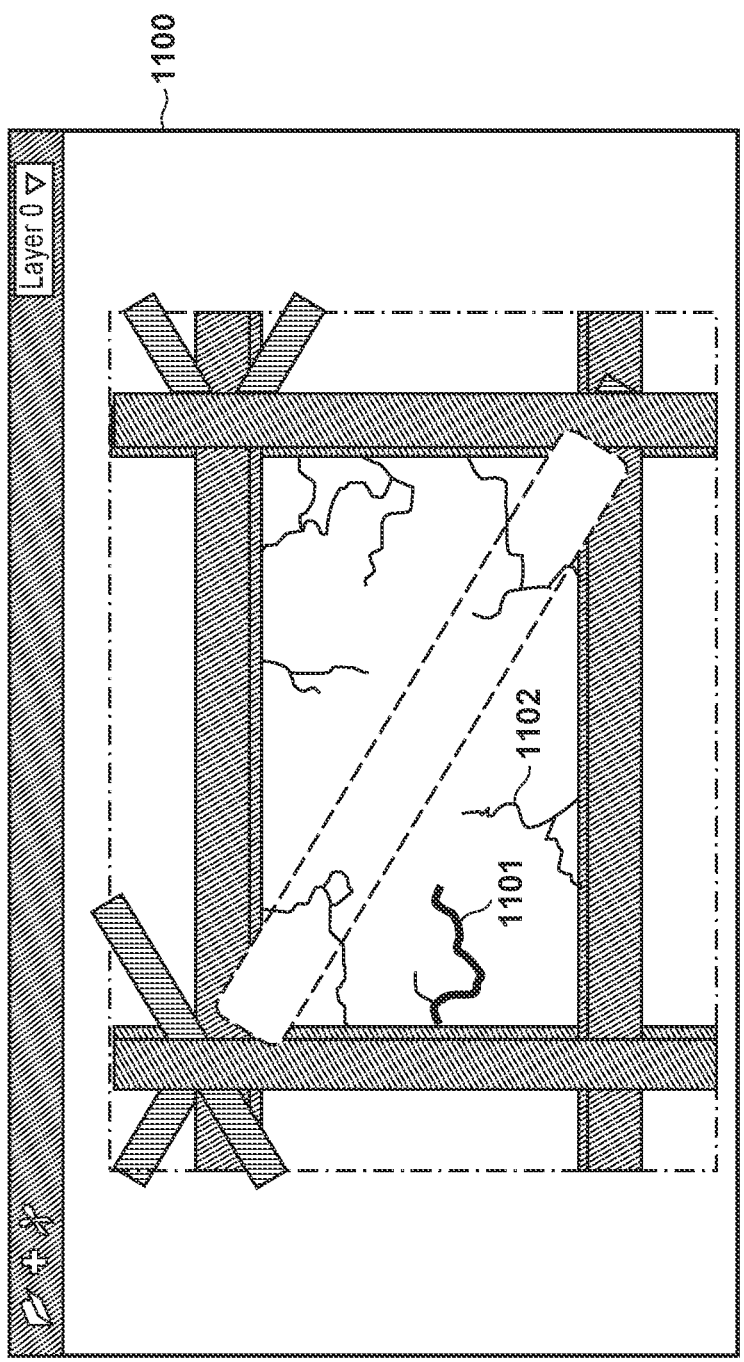
FIG. 11 is a view exemplarily showing a screen after variation detection is performed on a synthesized image.

FIG. 11 is a view showing an example of a screen in which variations detected by the variation detection module 307 are superimposed and displayed on a synthesized image. In a window 1100, a synthesized image related to a portion different from that shown in the window 900 is displayed. A bold line 1101 is a part (corresponding to one crack) of crack data on the floor slab 100 detected by the variation detection module 307. In this manner, it is preferable that the crack data is highlighted by a hold line, a broken line, or a colored line so that the crack data can be easily identified and compared with a crack 1102 appearing in the synthesized image.

Operation of Image Processing Apparatus

Figure 5:
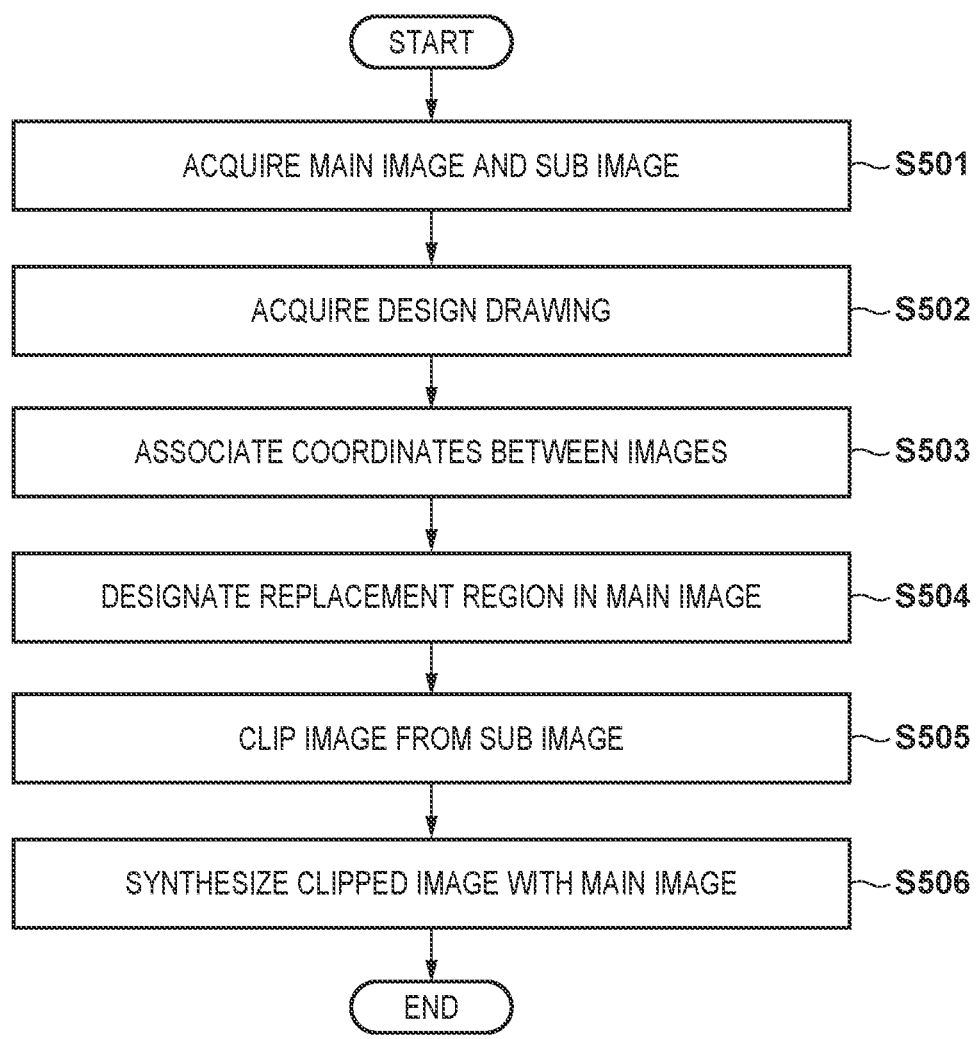
FIG. 5 is a flowchart for explaining an operation of the image processing apparatus.

FIG. 5 is a flowchart for explaining an operation of the image processing apparatus according to the first embodiment. Note that in the following description, an example in which a captured image of the range 130a is used as a main image and a captured image of the range 130b is used as a sub image will be described. More specifically, an example will be described in which a synthesized image is generated in which the image region of the diagonal member in the image 200a is replaced with a partial image of the floor slab that appears at a corresponding position in the image 200b.

In step S501, the alignment module 303 acquires a main image and one or more sub images to be synthesized from the image data storage module 301. For example, a captured image obtained by capturing the floor slab region 100a to be processed from the front (immediately below) is read out from the image data storage module 301 as a main image. Then, the image data management module 302 is inquired of a captured image obtained by capturing the floor slab region laterally adjacent to the floor slab region 100a from the front, and the corresponding captured image is read out from the image data storage module 301 as a sub image. Here, a captured image of the left adjacent floor slab region 100b captured from the front is read out as a sub image.

In step S502, the alignment module 303 reads out the design drawing from the image data storage module 301. As has been described above, the design drawing is an orthographic projection view as viewed from below the bridge, and is, for example, an image as shown in FIG. 1.

In step S503, the alignment module 303 accepts an association relationship of the coordinates between the main image and the design drawing from the user, and derives a homography matrix as a coordinate conversion parameter between the main image and the design drawing. In addition, an association relationship between the coordinates of the sub image and the design drawing is accepted from the user, and a homography matrix as a coordinate conversion parameter between the sub image and the design drawing is derived. Thus, it becomes possible to convert the main image and the sub image (the central projection image captured by the camera) into an orthographic projection image (orthogonal conversion). In addition, as a result, the coordinate relationship is associated between the main image and the sub image.

Here, the user associates four vertices, serving as feature points, of the four corners of the floor slab region 100a in the image 200a with four vertices, serving as feature points, of the four corners of the floor slab region 100a on the design drawing. In addition, four vertices of the floor slab region 100a in the image 200b are associated with the four vertices of the four corners of the floor slab region 100a on the design drawing. However, it is expected that the two left vertices in the image 200*b* are shielded by the steel bridge girder. Therefore, it is preferable to designate two vertices with this in mind. For example, instead of the four corners of the floor slab region 100*a*, corners of the bridge girder that is assumed to exist on substantially the same plane as the floor slab region may be designated. Also, for example, the positions of the hidden two vertices behind the bridge girder on the image may be specified by drawing an auxiliary line based on the remaining two viewable vertices, the corners of the bridge girder, and the like, and the specified points may be designated. A feature point other than the vertex may be designated, if any. Note that the feature point desirably exists on substantially the same plane as the floor slab.

In step S504, the replacement region designation module 304 accepts a designation of a replacement region in the main image from the user. As has been described above, a replacement region is a region in which the floor slab is shielded so it does not appear in the main image. Here, the region of the diagonal member in the image 200*a* is designated. Note that a region larger than the region of the diagonal member may be designated, assuming that image edition may be required after synthesis is performed. Instead of directly designating the replacement region, a designation of an image feature (texture or the like) of the replacement region may be accepted. In this case, the replacement region designation module 304 selects a region in the main image similar to the designated image feature and designates the region as the replacement region.

In step S505, the image clipping module 305 clips the image of the region in the sub image corresponding to the replacement region (given region) designated in step S504. Here, the coordinates of the replacement region in the main image are converted into coordinates in the sub image using the coordinate conversion parameters derived by the alignment module 303, and the image of the clipped region corresponding to the coordinates obtained by the conversion is clipped from the sub image. Note that a region larger than the clipped region derived from the replacement region may be clipped, assuming that image edition may be required after synthesis is performed. However, if it is determined based on the image feature or the like that a portion other than the floor slab appears in the extended region, this region may be excluded from the clipping target.

In step S506, the image synthesis module 306 overwrites (replaces) the replacement region in the main image designated in step S504 with the clipped image clipped in step S505 to generate a synthesized image. Note that when the clipped image is synthesized with the main image, the clipped image is converted into a coordinate position in the main image based on the homography matrix derived in step S503, and then synthesis is performed. The generated synthesized image is held in the image data storage module 301.

Figure 12:
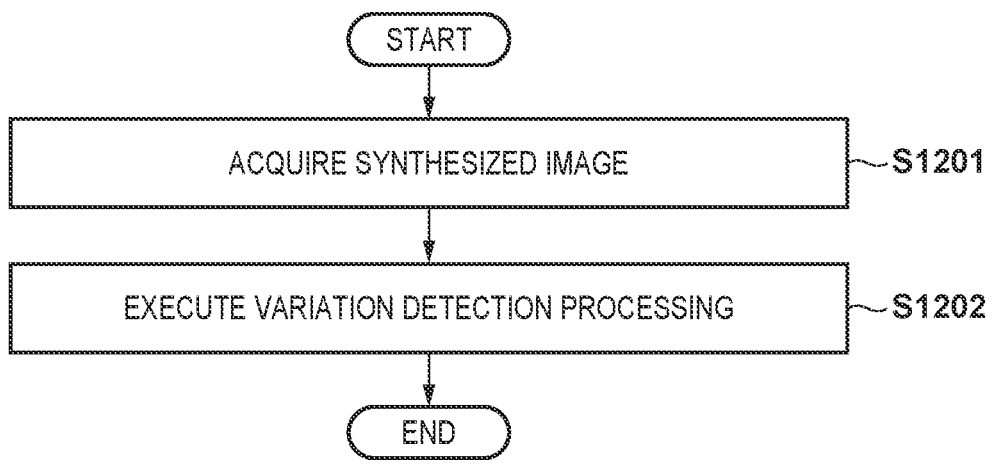
FIG. 12 is a flowchart illustrating an operation of the image processing apparatus upon performing variation detection on the synthesized image.

FIG. 12 is a flowchart illustrating an operation of applying variation detection processing to a synthesized image obtained by synthesizing a clipped image with a main image. In step S1201, the variation detection module 307 acquires a synthesized image to be a target of variation detection from the image data storage module 301. In S1202, the variation detection module 307 applies variation detection processing to the synthesized image acquired in step S1201. In this embodiment, the variation detection module 307 automatically detects a crack from an image using machine learning, and records the detected location as crack data.

Figure 6:
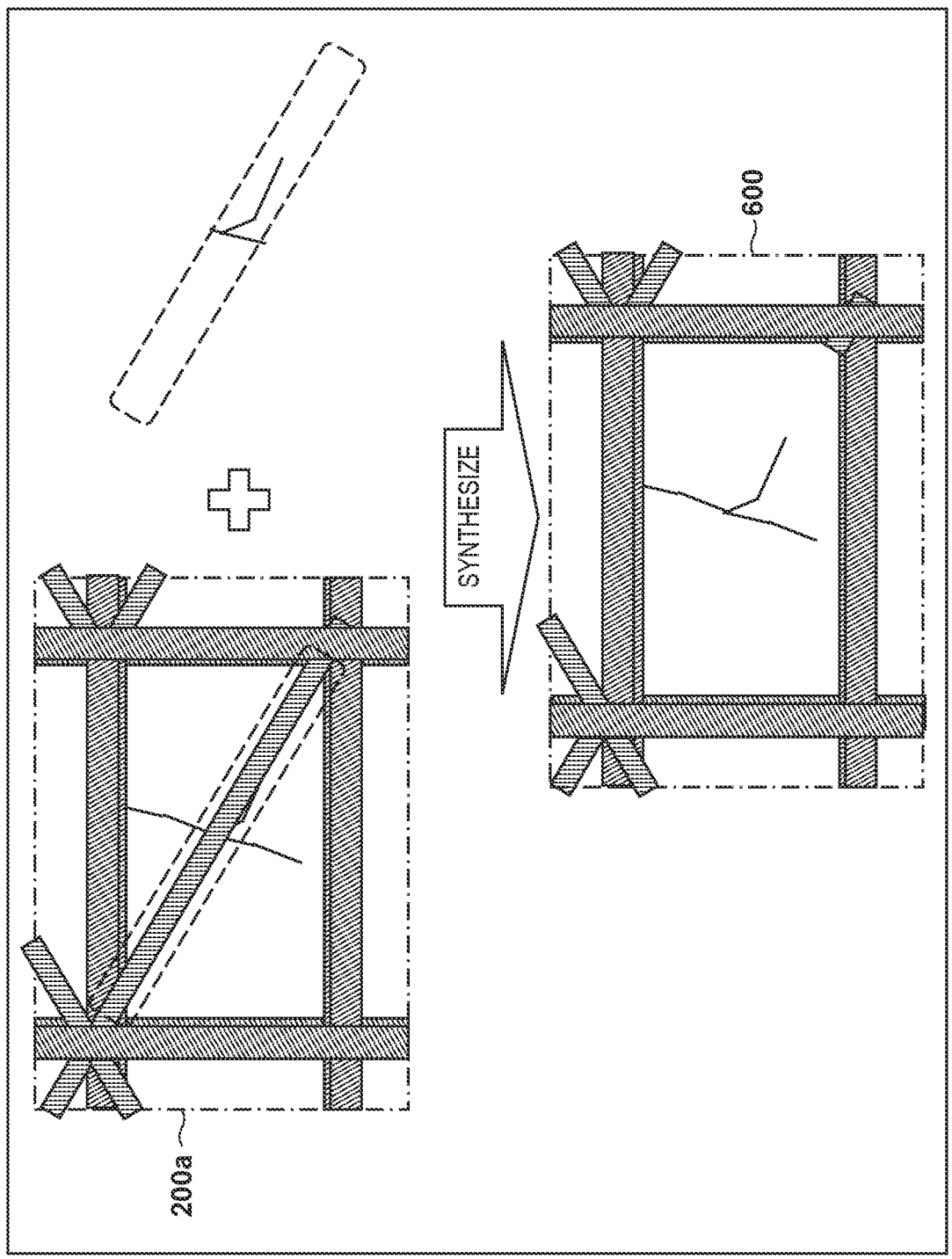
FIG. 6 is a view for explaining generation of a synthesized image.

FIG. 6 is a view for explaining generation of a synthesized image by superimposing a clipped image on a main image. As shown in FIG. 6, a generated synthesized image 600 includes a floor slab image including the entire target floor slab region. Of course, this is not the case when there is a partial region that appears in neither the main image nor the sub image. In such a case, it is possible to generate one synthetized image that includes the larger range of the target floor slab region by synthesis processing using one or more images captured from further different viewpoints, and use the synthesized image as a target of variation detection processing. Note that as has been described above, in order to make it possible to correct the positional shift between the main image and the clipped image, the clipped image may be displayed as an editable object image and a deformation operation such as scaling may be accepted from the user.

As has been described above, according to the first embodiment, images captured from two different viewpoint positions are synthesized. With this processing, it becomes possible to generate an image suitable for variation detection processing even in a situation in which an obstacle (diagonal member) exists between the inspection object (floor slab) and the camera.

Note that in the above description, a mode in which one sub image is used for one main image has been described, but two or more sub images may be used. For example, in addition to the captured image (image 200*b*) obtained by capturing the left adjacent floor slab region from the front, a captured image obtained by capturing the right adjacent floor slab region from the front may also be used as the sub image.

Modification 1

In modification 1, a mode in which a plurality of images captured from a plurality of viewpoint positions are directly associated with each other will be described. Note that the apparatus arrangement is substantially the same as that in the first embodiment, so that a description thereof wilt be omitted.

Operation of Image Processing Apparatus

Figure 7:
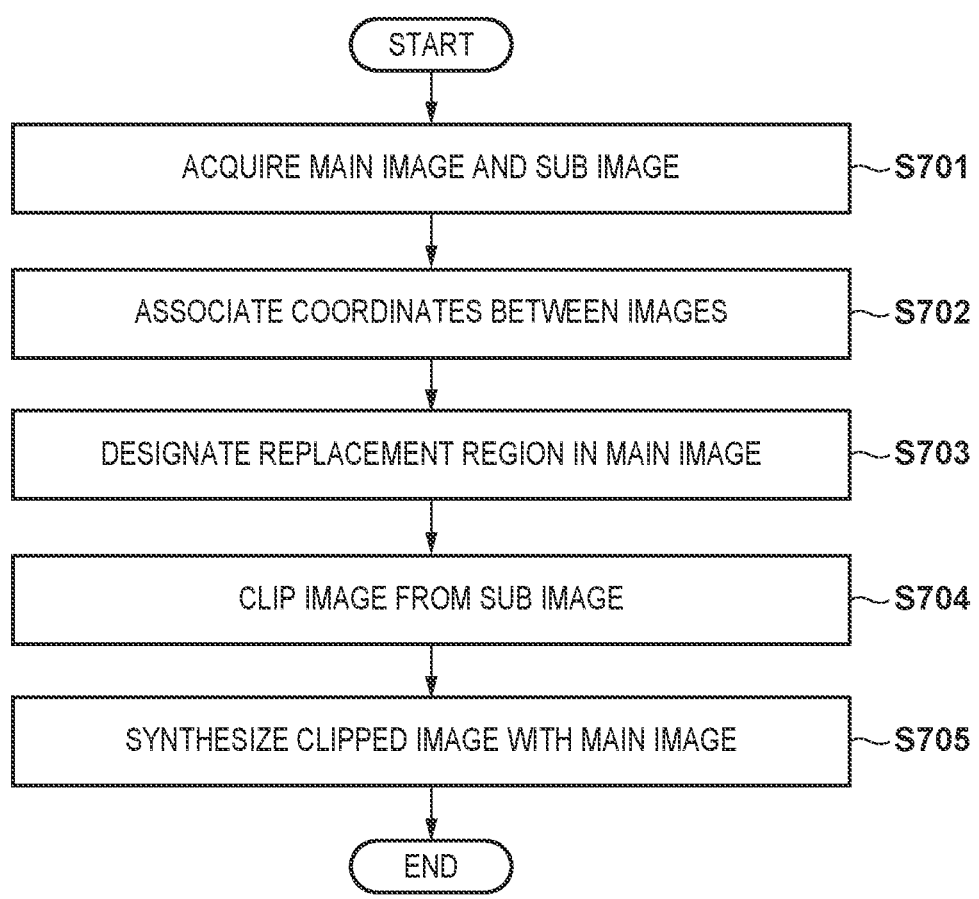
FIG. 7 is a flowchart for explaining an operation of the image processing apparatus.

FIG. 7 is a flowchart for explaining an operation of the image processing apparatus according to modification 1. Note that in the following description, as in the first embodiment, an example in which a captured image of the range 130*a* is used as a main image and a captured image of the range 130*b* is used as a sub image will be described.

In step S701, the alignment module 303 reads out a main image and one or more sub images to be synthesized from the image data storage module 301. In step S702, the alignment module 303 accepts an association relationship of the coordinates between the main image and the sub image from the user, and derives a homography matrix as a coordinate conversion parameter between the images.

Here, the user associates four vertices of the four corners of the floor slab region 100*a* in the image 200*a* with four vertices of the four corners of the floor slab region 100*a* in the image 2001. However, it is expected that the two left vertices in the image 200*b* are shielded by the steel bridge girder. Therefore, it is preferable to designate two vertices with this in mind. A feature point other than the vertex may be designated, if any. Note that the feature point desirably exists on substantially the same plane as the floor slab.

Steps S703 to S705 are similar to steps S504 to S506 in the first embodiment, so that a description thereof will be omitted.

As has been described above, according to modification 1, it becomes possible to synthesize captured images captured from two different viewpoint positions without using the design drawing. With this processing, it becomes possible to generate an image suitable for variation detection processing even in a situation in which an obstacle (diagonal member) exists between the inspection object (floor slab) and the camera.

Modification 2

In the first embodiment, when a positional shift occurs between the main image and the image clipped from the sub image, the user can perform edition such as scaling or moving using the GUI as shown in FIG. 9. However, the shift between the main image and the clipped image cannot always be compensated for only by edition by scaling or moving. In modification 2, there will be described processing of correcting a positional shift of a variation or texture occurring in a boundary portion when a clipped image is superimposed and displayed on a main image (and when they are synthesized) according to the first embodiment or modification 1.

Figure 13:
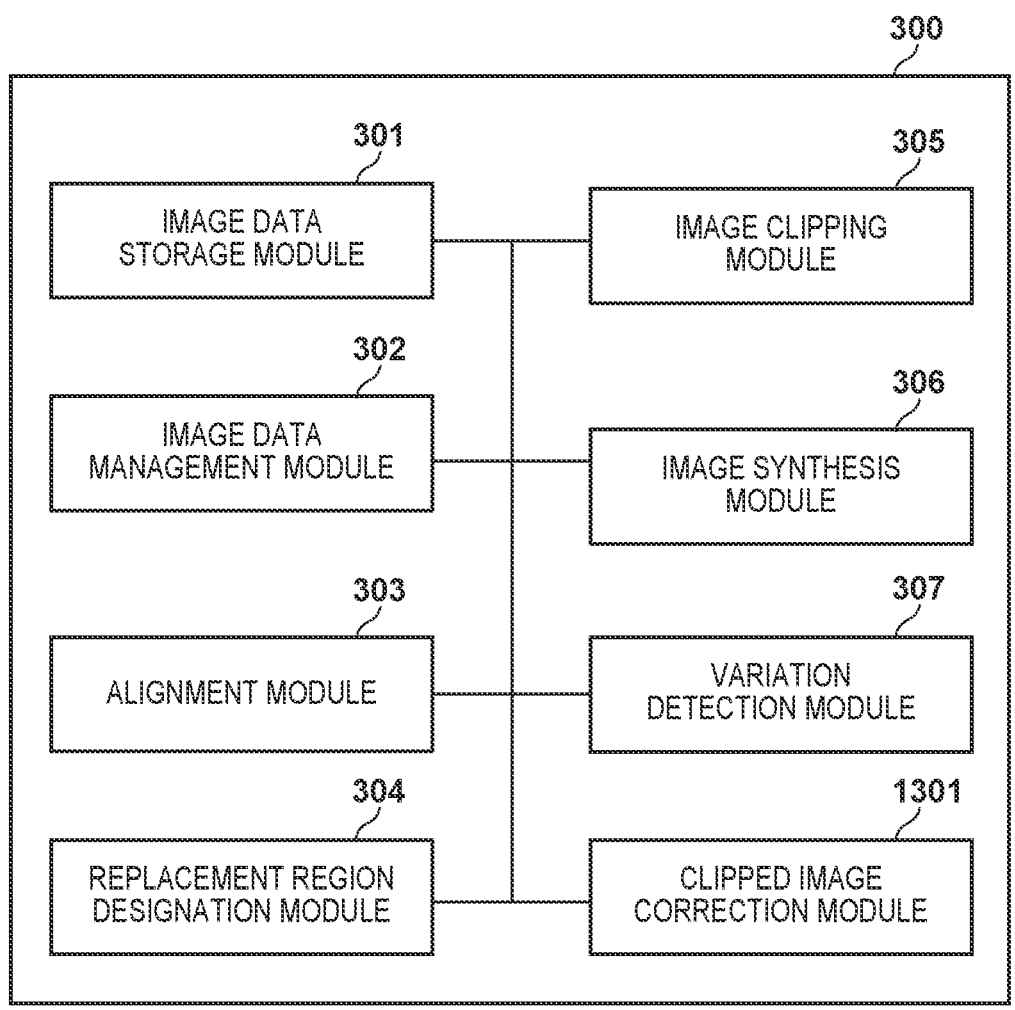
FIG. 13 is a block diagram showing an example of the functional arrangement of the image processing apparatus.

FIG. 13 is a block diagram showing the functional arrangement of the image processing apparatus 300. Regarding the functional arrangement, the description of parts similar to those in the first embodiment will be omitted. A clipped image correction module 1301 is a functional unit that applies image processing to a clipped image in order to correct a shift of a variation, texture, or color in a boundary portion between the main image and the clipped image.

Figure 14:
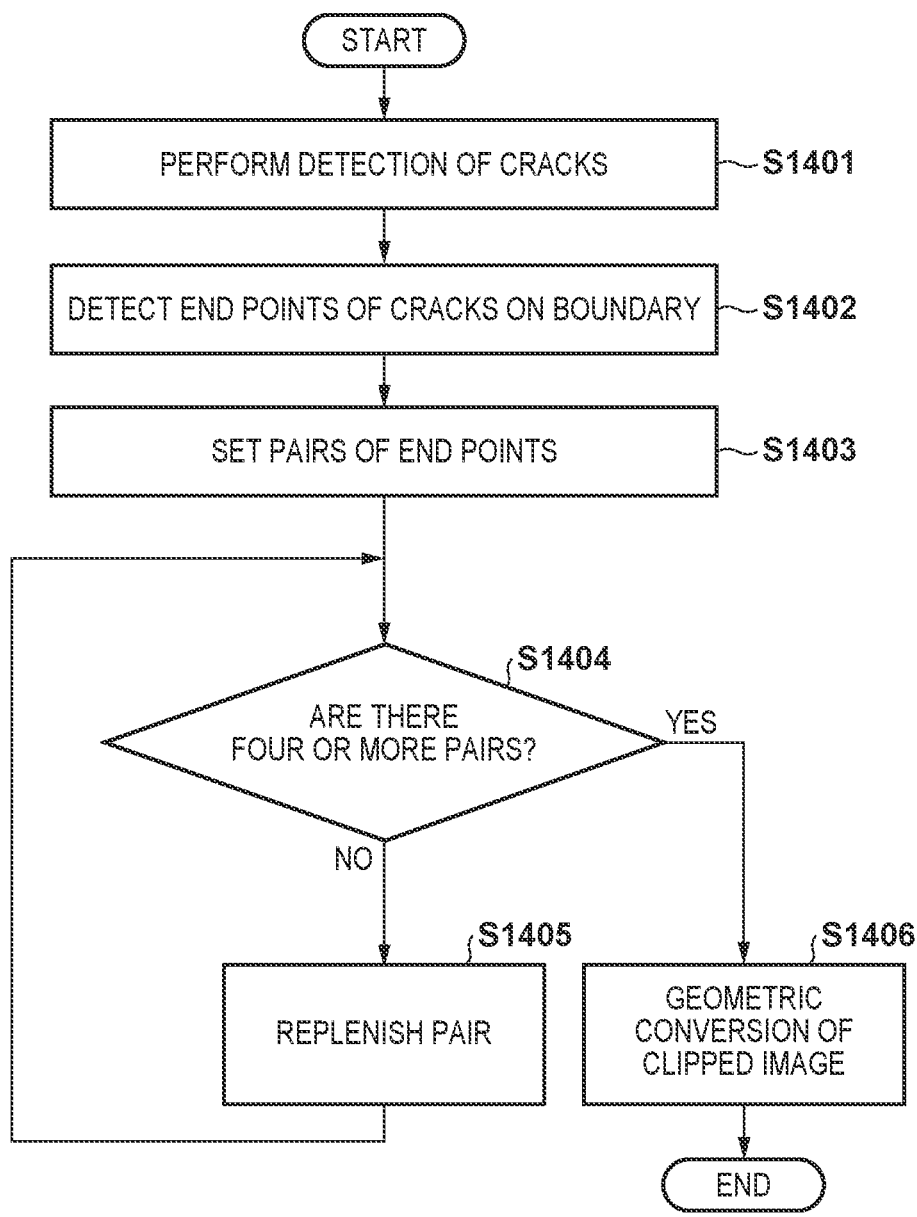
FIG. 14 is a flowchart for explaining an operation of the image processing apparatus.

FIG. 14 is a flowchart for explaining an example of the operation of the image processing apparatus according to modification 2. This processing is performed as preprocessing of the image synthesis processing shown in FIG. 5 (step S506) or FIG. 7 (step S705). Alternatively, the processing is performed as processing of optimizing a synthesized image to be processed in variation detection processing shown in FIG. 12 (step S1202). Note that in the following description, as in the first embodiment, an example in which a captured image of the range 130a is used as a main image and a captured image of the range 130b is used as a sub image will be described.

Figure 15A:
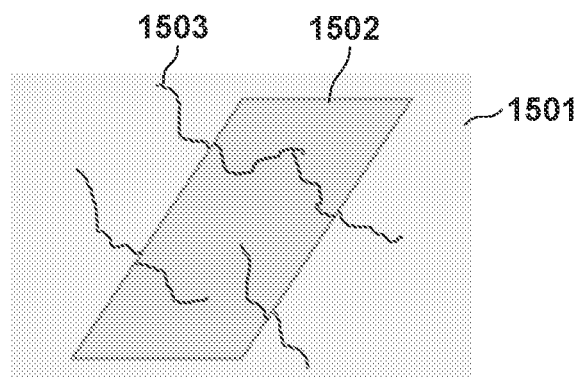
FIG. 15A is a view stepwisely showing processing of correcting a positional shift between a main image and a clipped image.
Figure 15B:
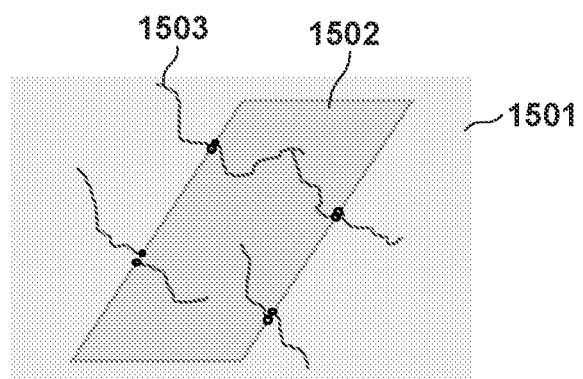
FIG. 15B is a view stepwisely showing the processing of correcting a positional shift between a main image and a clipped image.
Figure 15C:
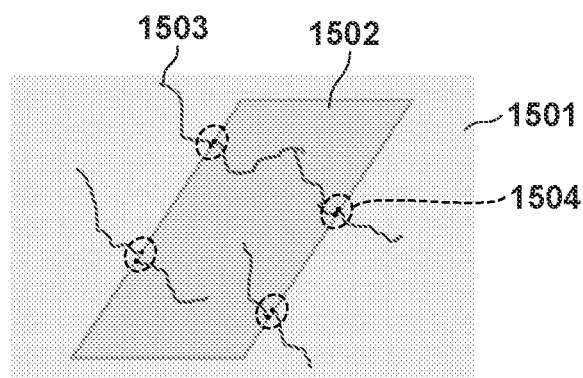
FIG. 15C is a view stepwisely showing the processing of correcting a positional shift between a main image and a clipped image.

In step S1401, the variation detection module 307 performs crack detection processing on a main image and a clipped image. FIG. 15A is a view showing a state in which the clipped image is superimposed on the main image. Cracks 1503 are detected in each of a main image 1501 and a clipped image 1502. In step S1402, the clipped image correction module 1301 acquires end points of the cracks on the boundary of a region designated by the replacement region designation module 304. FIG. 15B is a view showing a state in which the end points of the cracks on the boundary between the main image 1501 and the clipped image 1502 are specified. Here, eight specified end points are indicated by dots. In step S1403, the clipped image correction module 1301 creates pairs of the end point of the crack in the main image and the end point of the crack in the clipped image acquired in step S1402 so that the end points falling within a predetermined range are paired. FIG. 15C is a view showing a state in which the end point of the crack on the main image 1501 and the end point of the crack on the clipped image 1502 are paired. Here, each pair of two end points is surrounded by a circle 1504 indicated by dotted line, and a state in which four pairs are set is shown. In step S1404, the clipped image correction module 1301 determines whether there are four or more pairs each including the end point of the crack in the main image and the end point of the crack in the clipped image. If the number of pairs is less than four, the process advances to step S1405. If the number of pairs is four or more, the process advances to step S1406.

In step S1405, the clipped image correction module 1301 accepts the association relationship of the coordinates between the clipped image and the main image from the user, and creates a pair from the two input coordinates. This is processing of replenishing a pair so that geometric conversion to be described later can be executed based on a total of four or more pairs. For example, a pair of coordinates determined by the alignment module 303 and associated with each other to align the main image and the sub image (step S503 or S702) may be used. Alternatively, a pair of coordinates associated by the user newly selecting an arbitrary position in each of the main image and the clipped image may be used. Note that the coordinates designated on the clipped image are desirably coordinates on a region where the user wants to suppress the influence of conversion in geometric conversion of the clipped image performed in step S1406 to be described later. Also, even when four or more pairs have been generated in step S1403, a user input of a pair may be accepted for the purpose of designating a region where the user wants to suppress the influence of conversion. Note that it is determined here whether the number of pairs is "four or more" in step S1404, assuming geometric conversion using a homography matrix. However, when another geometric conversion is used, the number may be any number necessary for the geometric conversion, and may not be "four or more".

Figure 15D:
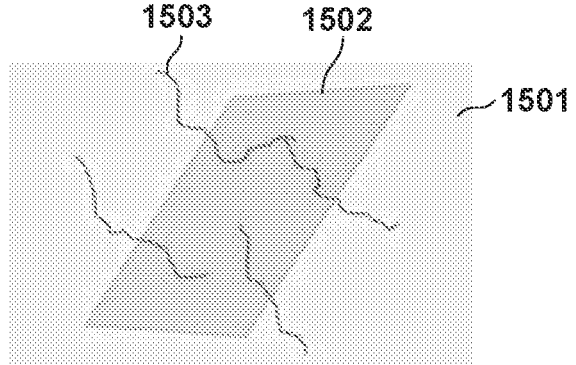
FIG. 15D is a view stepwisely showing the processing of correcting a positional shift between a main image and a clipped image.

In step S1406, the clipped image correction module 1301 derives a homography matrix using the pairs of the coordinates on the main image and the coordinates on the clipped image. Then, geometric conversion based on the derived homography matrix is applied to the clipped image. FIG. 15D is a view showing a state in which the clipped image with the geometric conversion applied thereto is superimposed and displayed on the main image in step S1406. The clipped image geometrically converted as described above is, for example, overwritten on the synthesized image, and can be used in variation detection processing. In addition, for example, it is possible to provide a user interface capable of superimposing and displaying the geometrically-converted clipped image on the synthesized image or switching on/off the superimposed display. For example, the clipped image superimposed on the synthesized image (or the main image) may be displayed as an editable object image, and the positional shift may be further corrected by accepting a deformation operation such as scaling from the user.

Note that in the boundary portion between a main image and a clipped image, not only a positional shift of a variation or texture but also a shift of color (color shift) may occur. Two methods of correcting a color shift in the boundary portion will be described below. One is a method using histogram matching that matches the distribution of the color histogram of the clipped image with the distribution of the color histogram of the main image. The other is a method of blending the clipped image with the main image by setting the transparency continuously changed from the center to the outside in the vicinity of the boundary portion of the clipped image.

Figure 16A:
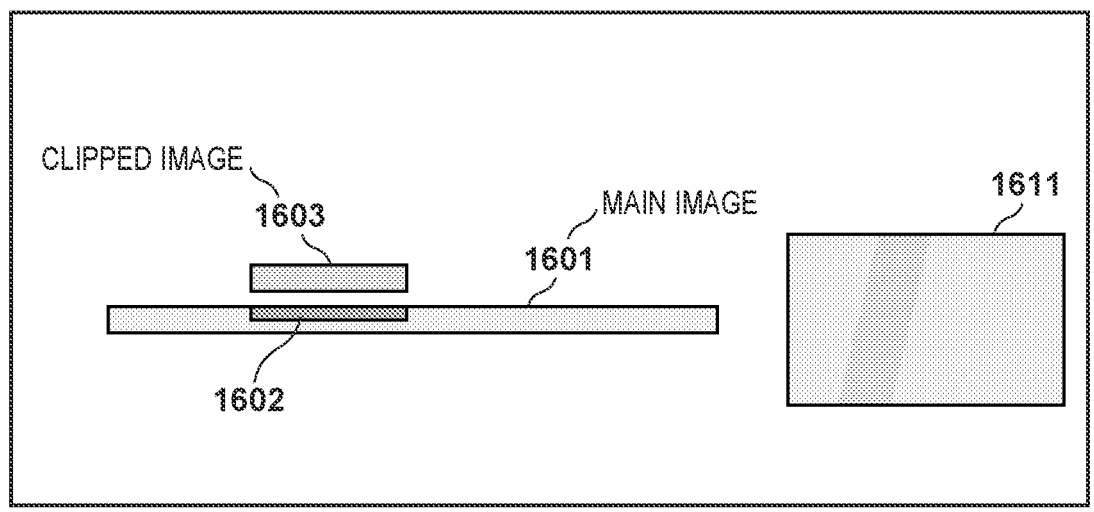
FIG. 16A is a view showing an example of a method of blending a boundary portion between a main image and a clipped image.

FIGS. 16A to 16D are views showing a method of blending the boundary portion between a main image and a clipped image. Each of FIGS. 16A to 16D includes schematic views showing the positional relationship between the main image and the clipped image when viewed from the side and when viewed from above. FIG. 16A is a view showing a state in which a clipped image 1603 is superimposed on a diagonal member region 1602 (that is, a replacement region) appearing in a main image 1601. An image 1611 exemplarily shows occurrence of a color shift in the boundary portion.

Figure 16B:
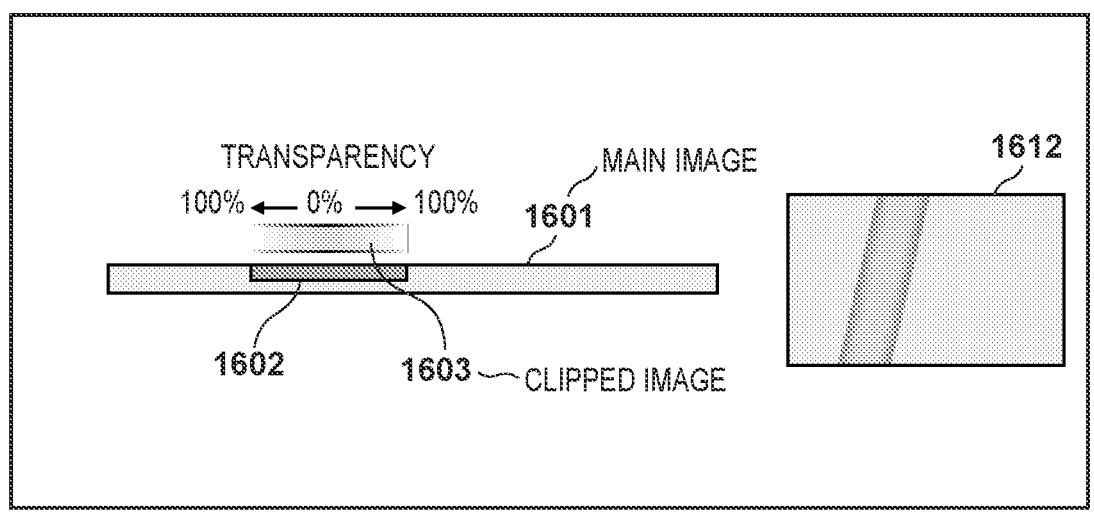
FIG. 16B is a view showing the example of the method of blending the boundary portion between the main image and the clipped image.

FIG. 16B is a view showing a state in which the transparency of the center portion of the clipped image is set to 0% and continuously changed to 100% toward the outer boundary portion. Note that in this case, the transparency at the edge of the clipped image is set to 100%. Accordingly, when the width of the clipped image 1603 and the width of the diagonal member region 1602 are substantially the same, the diagonal member region 1602 appearing in the main image 1601 is seen through the clipped image 1603. An image 1612 exemplarily shows a state in which the diagonal member region 1602 is seen through the clipped image 1603. Therefore, when clipping the clipped image 1603 from the sub image, it is preferable to clip a region larger than the range of the diagonal member region 1602. By setting the transparency continuously changed from 0% to 100% with respect to such the clipped image 1603, the blending can be performed without allowing the diagonal material to be seen through the clipped image 1603.

Figure 16C:
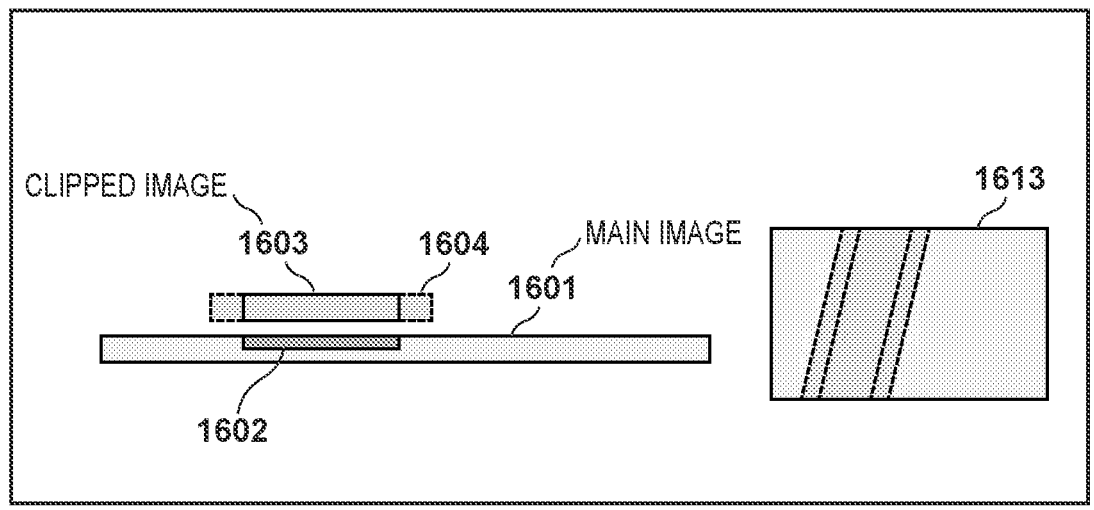
FIG. 16C is a view showing the example of the method of blending the boundary portion between the main image and the clipped image.
Figure 16D:
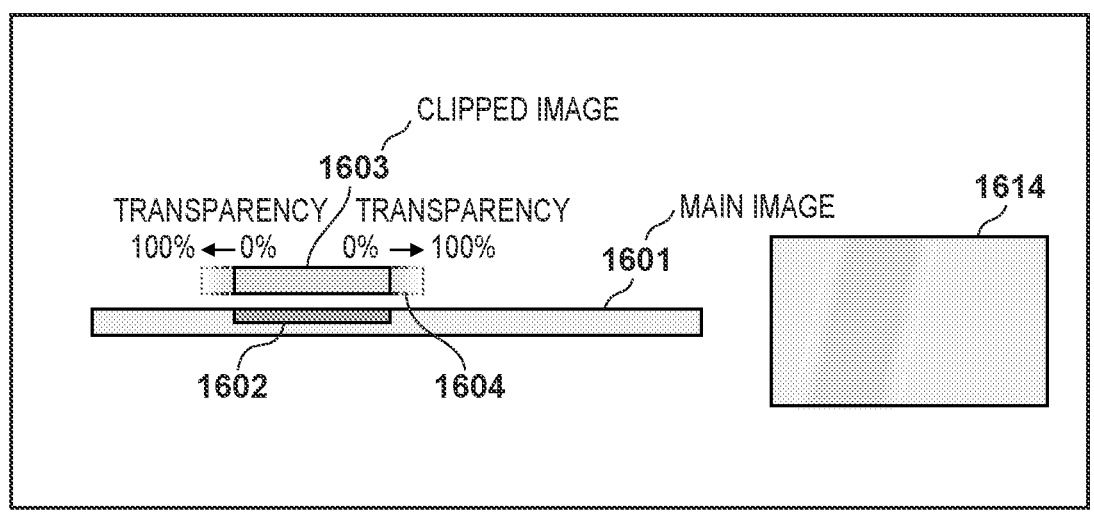
FIG. 16D is a view showing the example of the method of blending the boundary portion between the main image and the clipped image.

FIG. 16C is a view showing a state in which the clipped image 1603 including a peripheral region 1604 is clipped when an image region in the sub image corresponding to the replacement region is clipped. That is, FIG. 16C shows a state in which an extended partial region larger than the replacement region is clipped. An image 1613 exemplarily shows occurrence of a color shift in the boundary portion between the peripheral region 1604 and the main image in this case. FIG. 16D is a view showing a state in which the transparency of a portion corresponding to the diagonal member region 1602 (that is, the replacement region) is set to 0% and the transparency of the peripheral region 1604 is changed in the larger clipped image (extended partial region). Here, an example is shown in which the transparency of the peripheral region 1604 is continuously changed from 0% to 100% from the side in contact with the clipped image 1603 to the outside (toward the boundary with the main image). An image 1614 exemplarily shows a state in which the color shift in the boundary portion is not noticeable due to this processing.

If a positional shift of a variation or texture or a color shift occurs in the boundary portion between the main image and the clipped image, false detection such as miscounting of the number of cracks or regarding the boundary line as a crack may occur in variation detection processing. According to modification 2, occurrence of such false detection can be reduced. Note that in modification 2, a method of correcting a positional shift and a method of correcting a color shift have been described, but image processing is not limited thereto. Similarly, based on any or all of the hue, the saturation, and the brightness in one of a main image and a sub image, any of the hue, the saturation, and the brightness of a partial region in the other image can be adjusted and reflected on a synthesized image. This can improve the accuracy of variation detection processing that is executed subsequently.

According to the present invention, a technique of generating an image which enables more suitable detection of variations can be provided. Other features and advantages of the present invention will become apparent from the description with reference to the accompanying drawings.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
   one or more processors; and
   one or more memories including instructions that, when executed by the one or more processors, cause the image processing apparatus to perform a method comprising:
   (1) acquiring a first image which captures a scene including an object from a first viewpoint position and a second image which captures a scene including the object from a second viewpoint position different from the first viewpoint position;
   (2) associating a coordinate position corresponding to a position of a feature of the object on the first image with a coordinate position corresponding to a position of a feature of the object on the second image;
   (3) determining a partial region in the second image corresponding to a given region in the first image based on the association;
   (4) generating a synthesized image by replacing an image of the given region in the first image using an image of the determined partial region; and
   (5) superimposing and displaying the first image and the second image on a display unit based on the association so that both the first image and the second image are visible.

2. The image processing apparatus according to claim 1, wherein the method further comprises detecting a variation that has occurred in the object based on analysis of the synthesized image, and
   wherein, in the displaying, the image processing apparatus displays the variation data representing the detected variation by superimposing the variation data on the synthesized image.

3. The image processing apparatus according to claim 1, wherein the image processing apparatus further acquires a design drawing of the object, and
wherein the image processing apparatus associates the coordinate position corresponding to the position of the feature of the object on the first image with a coordinate position corresponding to a position of the feature of the object on the design drawing, and associates the coordinate position corresponding to the position of the feature of the object on the second image with the coordinate position corresponding to the position of the feature of the object on the design drawing.

4. The image processing apparatus according to claim 1, wherein the method further comprises designating the given region in the first image.

5. The image processing apparatus according to claim 4, wherein the method further comprises accepting a designation of a region of an arbitrary shape in the first image from a user, and
wherein the image processing apparatus designates the region of the arbitrary shape as the given region.

6. The image processing apparatus according to claim 5, wherein the image processing apparatus is configured to be capable of accepting a plurality of regions of an arbitrary shape, and
wherein the image processing apparatus designates, as the given region, a region obtained by a logical sum or a logical product of the plurality of regions of the arbitrary shape.

7. The image processing apparatus according to claim 4, wherein the method further comprises accepting a designation of an image feature from a user, and
wherein the image processing apparatus designates a region in the first image similar to the image feature as the given region.

8. The image processing apparatus according to claim 1, wherein the method further comprises arranging and displaying the first image and the second image on a display unit,
wherein the image processing apparatus performs control so as to display, synchronously with the given region, the determined partial region in the second image.

9. The image processing apparatus according to claim 1, wherein the superimposing comprises superimposing the second image having undergone translucent processing on the first image on the display unit, and
wherein the image processing apparatus performs control so as to superimpose and display the second image having undergone the translucent processing on the first image based on the association.

10. The image processing apparatus according to claim 9, wherein the method further comprises designating a transparency in the translucent processing.

11. The image processing apparatus according to claim 9, wherein the method further comprises accepting a designation of the given region in the first image on which the second image having undergone the translucent processing is superimposed.

12. The image processing apparatus according to claim 9, wherein the method further comprises displaying a transparency of the second image having undergone the translucent processing on a display unit.

13. The image processing apparatus according to claim 1, wherein the method further comprises performing image processing for correcting a shift occurring between the partial region and the first image in the synthesized image.

14. The image processing apparatus according to claim 13, wherein the image processing apparatus corrects a positional shift occurring between the partial region and the first image by deforming the image of the partial region based on an association relationship between coordinates specified from a boundary of the given region and coordinates specified from a boundary of the partial region.

15. The image processing apparatus according to claim 14, wherein the variation that has occurred in the object is a crack that has occurred in a structure, and
wherein the image processing apparatus specifies an end point of a crack detected from the first image on the boundary of the given region and an endpoint of a crack detected from the second image on the boundary of the partial region, and deforms the partial region based on association of the end points falling within a predetermined range among the specified end points.

16. The image processing apparatus according to claim 13, wherein the image processing apparatus corrects a color shift occurring between the partial region and the first image by adjusting any or all of a hue, a saturation, and a brightness of the partial region based on any or all of a hue, a saturation, and a brightness of the first image.

17. The image processing apparatus according to claim 13, wherein the image processing apparatus corrects a color shift occurring between the partial region and the first image by adjusting any or all of a hue, a saturation, and a brightness of the first image based on any or all of a hue, a saturation, and a brightness of the partial region.

18. The image processing apparatus according to claim 13, wherein the image processing apparatus generates the synthesized image by superimposing, on the given region in the first image, the image of the partial region whose transparency is set, and
wherein the image processing apparatus corrects a color shift occurring between the partial region and the first image by setting the transparency that continuously increases from a center to an outside in the partial region.

19. The image processing apparatus according to claim 18, wherein the image processing apparatus generates the synthesized image by superimposing an image of an extended partial region that is larger than the determined partial region on the given region in the first image, and
wherein the image processing apparatus corrects a color shift occurring between the partial region and the first image by setting, in a region of the extended partial region extending from the partial region, a transparency that continuously increases from a side in contact with the partial region to an outside of the extended partial region.

20. The image processing apparatus according to claim 1, wherein the method further comprises deriving, based on the association, a coordinate conversion parameter that mutually converts a coordinate position in the object included in the first image and a coordinate position in the object included in the second image, and
wherein the image processing apparatus determines, based on the coordinate conversion parameter, the partial region in the second image corresponding to the given region in the first image.

21. The image processing apparatus according to claim 1, wherein the image of the given region in the first image is an image of a region where the variation that has occurred in the object is hidden by a shielding object in the first image; and wherein the image of the determined partial region is an image of a region where the variation that has occurred in the object is not hidden by the shielding object in the second image.

22. A control method in an image processing apparatus, the method comprising:
    acquiring a first image which captures a scene including an object from a first viewpoint position and a second image which captures a scene including the object from a second viewpoint position different from the first viewpoint position;
    associating a coordinate position corresponding to a position of a feature of the object on the first image with a coordinate position corresponding to a position of a feature of the object on the second image;
    determining a partial region in the second image corresponding to a given region in the first image based on the association;
    generating a synthesized image by replacing an image of the given region in the first image using an image of the determined partial region; and
    superimposing and displaying the first image and the second image on a display unit based on the association so that both the first image and the second image are visible.

23. A non-transitory computer-readable recording medium storing a program for causing a computer to function as an image processing apparatus comprising:
    an acquisition unit configured to acquire a first image which captures a scene including an object from a first viewpoint position and a second image which captures a scene including the object from a second viewpoint position different from the first viewpoint position;
    an association unit configured to associate a coordinate position corresponding to a position of a feature of the object on the first image with a coordinate position corresponding to a position of a feature of the object on the second image;
    a determination unit configured to determine a partial region in the second image corresponding to a given region in the first image based on the association by the association unit;
    a generation unit configured to generate a synthesized image by replacing an image of the given region in the first image using an image of the partial region determined by the determination unit; and
    a display control unit configured to superimpose and display the first image and the second image on a display unit based on the association so that both the first image and the second image are visible.

* * * * *